US009567163B2

(12) United States Patent
Svejkovsky et al.

(10) Patent No.: US 9,567,163 B2
(45) Date of Patent: Feb. 14, 2017

(54) IN-LINE ADJUSTABLE GATE

(71) Applicant: Paul A. Svejkovsky, Rockwall, TX (US)

(72) Inventors: P. Blake Svejkovsky, Coppell, TX (US); Paul A. Svejkovsky, Rockwall, TX (US)

(73) Assignee: Paul A. Svejkovsky, Rockwall, TX (US)

( * ) Notice: Subject to any disclaimer, the term of this patent is extended or adjusted under 35 U.S.C. 154(b) by 0 days.

(21) Appl. No.: 14/186,656

(22) Filed: Feb. 21, 2014

(65) Prior Publication Data
US 2015/0239677 A1    Aug. 27, 2015

(51) Int. Cl.
| | | |
|---|---|---|
| B65G 47/00 | (2006.01) |
| B65G 47/44 | (2006.01) |
| B65G 27/04 | (2006.01) |
| B65G 27/32 | (2006.01) |
| B65G 27/16 | (2006.01) |
| B65G 47/53 | (2006.01) |

(52) U.S. Cl.
CPC ............. *B65G 47/44* (2013.01); *B65G 27/04* (2013.01); *B65G 27/16* (2013.01); *B65G 27/32* (2013.01); *B65G 47/53* (2013.01)

(58) Field of Classification Search
CPC ......... B65G 47/44; B65G 27/04; B65G 27/16; B65G 27/32
USPC ........................................................ 198/360
See application file for complete search history.

(56) References Cited

U.S. PATENT DOCUMENTS

| | | | |
|---|---|---|---|
| 1,401,155 | A | 12/1921 | Jacoby |
| 2,776,741 | A | 1/1957 | Carrier, Jr. |
| 3,031,064 | A | 4/1962 | Kline |
| 3,042,360 | A | 7/1962 | Sneddon |
| 3,074,534 | A | 1/1963 | Thiele |
| 3,077,975 | A | 2/1963 | Hobbs, Jr. |
| 3,223,228 | A | 12/1965 | Ferris et al. |
| 3,258,165 | A | 6/1966 | Guyer |
| 3,279,592 | A | 10/1966 | Kerkvliet |
| 3,315,792 | A | 4/1967 | Tyndall |
| 3,342,315 | A | 9/1967 | Godley |

(Continued)

FOREIGN PATENT DOCUMENTS

| | | |
|---|---|---|
| DE | 508306 | 9/1930 |
| DE | 576689 | 5/1933 |

(Continued)

OTHER PUBLICATIONS

International Search Report and the Written Opinion of the International Searching Authority; (ISA) International Searching Authority; May 18, 2015.

*Primary Examiner* — William R Harp
(74) *Attorney, Agent, or Firm* — Streets & Steele; Patrick K. Steele; Jeffrey L. Streets

(57) ABSTRACT

A conveyor run for moving goods to two or more destinations can be used to move a first fraction of the goods to a first destination and a second fraction of the goods to another destination. A drive motor coupled to a conveyor portion is reversible to enable the conveyor run to move goods in either direction along the conveyor run. An adjustable gate includes a rotatable sleeve with an opening that is positionable relative to conveyor portions between which the adjustable gate is connected. The rotatable sleeve rotates relative to the adjacent conveyor portions to position the opening to set the fraction of the goods that pass from an upstream conveyor portion to the downstream conveyor portion and to (Continued)

set the fraction of the goods that drop from the conveyor run through the opening.

11 Claims, 7 Drawing Sheets

(56) References Cited

U.S. PATENT DOCUMENTS

| | | | |
|---|---|---|---|
| 3,511,363 | A | 5/1970 | Sibitz |
| 3,550,754 | A | 12/1970 | Ganz |
| 3,586,155 | A | 6/1971 | Turrentine et al. |
| 3,731,787 | A | 5/1973 | Gregor |
| 4,023,673 | A | 5/1977 | Hansen |
| 5,351,807 | A | 10/1994 | Svejkovsky |
| 5,526,920 | A | 6/1996 | Ellsworth |
| 5,555,967 | A | 9/1996 | Hufford |
| 5,794,757 | A | 8/1998 | Svejkovsky et al. |
| 5,842,678 | A | 12/1998 | Svejkovsky |
| 6,109,425 | A | 8/2000 | Serenkin |
| 6,119,849 | A | 9/2000 | Svejkovsky et al. |
| 6,286,665 | B1 | 9/2001 | Svejkovsky et al. |
| 6,378,688 | B1 | 4/2002 | Fitzgerald et al. |

FOREIGN PATENT DOCUMENTS

| | | |
|---|---|---|
| DE | 588013 | 11/1933 |
| EP | 1208977 | 10/1970 |
| FR | 921194 | 4/1947 |
| WO | 0048930 A1 | 8/2000 |

IN-LINE ADJUSTABLE GATE

FIELD OF THE INVENTION

The present invention relates to an adjustable conveyor gate, for use in a conveyor run, that can be adjusted to pass all, none or a selected fraction of a stream of goods received into the gate from a conveyor first portion to a conveyor second portion. All, none or a selected fraction of the stream of goods may be dropped from the conveyor run through the adjustable gate and to a separate conveyor run or other receiving structure.

BACKGROUND OF THE RELATED ART

Various types of conveyor gates have been devised for controllably moving a stream of goods through the gate, in a closed position, or for moving a stream of goods from a conveyor run using the gate, in an open position, so that the goods drop from a conveyor run including the gate to a lower conveyor run or to a storage member. Gates for conventional conveyor systems commonly include a slide mechanism that opens and closes an opening in the gate. These conventional gates can damage fragile goods when the gate is moved from the open to the closed position. Additionally, powered slide mechanisms used to operate conventional gates present a safety hazard because a closing gate may capture a finger or an article of clothing worn by an equipment operator working near the gate.

An improved rotatable gate for a conveyor system is disclosed in U.S. Pat. No. 6,378,688. Goods moving along a conveyor run ride on the lowermost portion of a trough in which the goods move. A rotatable sleeve of the gate disclosed in the '688 Patent includes an opening along a portion of its circumference such that, when the opening is in an elevated position, goods moved along a conveyor run that includes the adjustable gate will pass through the rotatable sleeve and are dropped from an adjacent end of the adjustable gate to a structure there below. But when the opening of the rotatable sleeve is rotated to a lowered position, all or some of the lowermost portion of the trough in which the goods move is absent, and all or some of the goods moving along the conveyor run enter the rotatable sleeve and drop through the opening and from the adjustable gate to a receiving structure below, such as a bagging machine or a lower conveyor run that moves the goods to a desired destination. Goods remaining on the conveyor run that includes the gate, i.e. any goods that move past the opening in the rotatable sleeve of the gate, will be discharged off of the end of the gate to a receiving structure below.

The gate disclosed in the '688 Patent has limitations, however, in that the gate "drops" the goods either through the opening in the rotatable sleeve or off the end of the gate. Either way, the goods are dropped very near to the adjustable gate. For certain types of conveyors, elevating goods to a higher position is difficult—goods can be moved only horizontally along the conveyor run or downwardly from the conveyor run. A shortcoming of the gate of the '688 Patent is that goods can be dropped from the end of the gate, for example, to a lower receiving conveyor run, or goods can be dropped through the opening in the rotatable sleeve of the gate, for example, to a lower receivable conveyor run, but the conveyor run or other receiving structure underneath the end of the adjustable gate is necessarily very close to the conveyor run or other receiving structure underneath the adjustable gate. This may result in unwanted crowding of the process area underneath the adjustable gate.

The adjustable gate of the prior art has shortcomings. For example, it may be desirable to move the goods that do not fall through the opening in the adjustable gate further from the goods that drop directly underneath the adjustable gate. Also, the loss of elevation of the goods that drop from the rotatable sleeve of the adjustable gate or moving through the rotatable sleeve of the adjustable gate to drop off the end of the gate, along with the unwanted crowding underneath the gate, limits the flexibility of the conveyor system that includes the conveyor run with the adjustable gate for moving goods to multiple desired destinations.

Another shortcoming of the gate of the '688 Patent is that it is unidirectional; that is, it can only be used at an end of a conveyor portion. The gate of the '688 Patent is not capable of moving goods that are not dropped from the adjustable gate in either direction through the gate. As a result, single-direction conveyor runs further limit the flexibility of the conveyor system.

These and other disadvantages of the prior art are overcome by the present invention.

SUMMARY OF THE INVENTION

One embodiment of the present invention provides an adjustable gate securable within a conveyor run and between a conveyor first portion and a conveyor second portion of the conveyor run. In a first mode, the conveyor first portion is disposed on an upstream side of the adjustable gate and moves the goods to and into the adjustable gate. If a rotatable sleeve within the gate is in the closed, or partially closed, position, a second conveyor portion disposed on a downstream side of the gate will receive and the goods, or some of the goods, and continue to move them along the second conveyor portion disposed on the downstream side of the adjustable gate.

The rotatable sleeve of the adjustable gate is rotatable to selectively position an opening in the rotatable sleeve at an elevated position to remove it from the path of the goods moving through the gate, or the opening in the rotatable sleeve may be rotated to a lowered position that is in the path of the goods so that some or all of the goods that enter the gate from a conveyor portion on an upstream side of the adjustable gate will fall through the opening in the rotatable sleeve of the adjustable gate and drop to another structure such as, for example, a receiving conveyor run positioned underneath the adjustable gate or some other receiving structure. The rotatable sleeve of the adjustable gate of the present invention is rotatable relative to the first and second conveyor portions that straddle the adjustable gate, and relative to a cage in which the rotatable sleeve is rotatably received. The cage of the adjustable gate is secured a tray flange at a first end to the discharge end of an upstream conveyor portion and using a tray flange at the second end to the inlet end of a downstream conveyor portion. It will be understood that the terms "discharge end" and "inlet end," as used herein, are terms that indicate the direction of movement of the goods to and through the gate, and these terms change if the direction of movement of the goods along the conveyor run in which the adjustable gate is installed is reversed.

The cage of the adjustable gate is sufficiently rigid and sturdy to withstand the vertical forces, the cyclically varying horizontal forces and the cyclically varying bending moments imparted to the cage by the upstream and downstream conveyor portions connected to the adjustable gate, and by operation of the differential impulse drive or other vibratory-type system that is coupled to one or to the other of the upstream and downstream conveyor portions. The opening of the rotatable sleeve of the adjustable gate of the present invention spans a substantial portion of a circumference of the rotatable sleeve. The angular position of the opening about an axis of the cage may be varied to selectively drop a variable fraction of the goods entering the gate from and adjacent portion of the conveyor run. When the opening is rotated to its lowermost position relative to the cage, all of the goods entering the adjustable gate will be dropped through the opening and from the conveyor run that includes the adjustable gate.

These and further features and advantages of the present invention will become apparent from the following detailed description, wherein reference is made to the appended drawings.

DETAILED DESCRIPTION OF PREFERRED EMBODIMENTS

Figure 1:
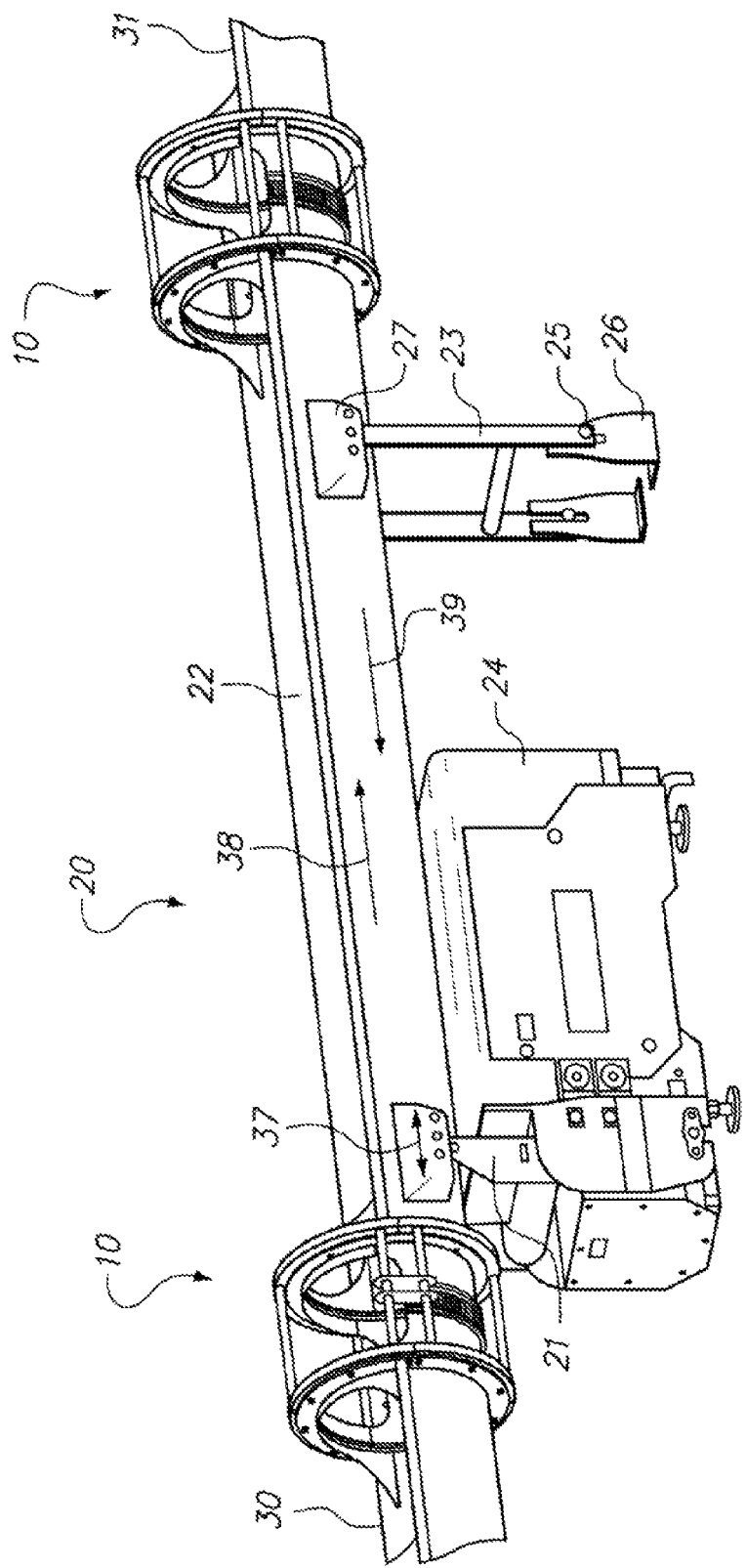
FIG. 1 is a perspective view of an embodiment of a conveyor run of the present invention having two adjustable gates and a reversible differential impulse drive.

FIG. 1 depicts an embodiment of a conveyor run 20 comprising an elongate tray 22 forming a trough which may have a generally semi-circular cross-section to move a stream of goods therein (not shown) along the generally linear path of the tray 22. The tray 22 is driven to reciprocate lengthwise by a differential impulse driver 24 that includes a motor (not shown) and a mechanism for converting the output of the motor to a reciprocating motion as indicated by the arrow 37. Support leg 23 is pivotally coupled to base 26 at pivot 25 and pivotally coupled to the tray 22 at leg coupling 27. A driver link 21 connects the differential impulse driver 24 to the tray 22 at a drive coupling 24.

The differential impulse driver 24 reciprocates the driver link 21 and the tray 22 connected thereto as indicated by the double-headed arrow 37. It will be understood that leg 23 merely pivotally supports the tray 22 and passively "follows" the tray 22 as it reciprocates as driven by the differential impulse driver 24. It will be understood that larger embodiments of conveyor runs 20 including adjustable gates 10 could be moved by two or more differential impulse drivers 24 that are synchronized to cooperate in moving goods along the conveyor run 20.

In one mode of operation, the differential impulse driver 24 moves goods along the tray 22 in the direction indicated by the arrow 38 by moving the tray 22 slowly in the direction indicated by the arrow 38 and then more rapidly in the reversed direction indicated by the arrow 39. The acceleration of the tray 22 from its leftmost position and in the direction indicated by arrow 38 is sufficiently slow so that the goods supported on the tray 22 move along with the tray 22 due to friction between the goods and the tray 22, but the acceleration of the tray 22 from the rightmost position and in the direction indicated by the arrow 39 is sufficiently great relative to the previous acceleration of the tray 22 in the direction indicated by the arrow 38 so as to cause the goods to slide along the tray 22 because the friction between the goods and the tray 22 is insufficient to prevent the goods from sliding along the tray 22. The net displacement of the goods resulting from this cyclic reciprocation of the tray 22 in this manner will be in the direction indicated by the arrow 38, and such movement of the goods along the tray 22 will be at a generally steady and predictable rate of movement with very little damage to the goods as compared to other conveyor types.

In one embodiment, the displacement of the tray 22 from the leftmost position and in the direction indicated by the arrow 38, and also from the rightmost position and in the reversed direction indicated by the arrow 39, is within the range from 0.25 inches to 3.0 inches. The displacement imparted to the tray 22 by the differential impulse driver 24 can be adjusted to optimize performance of the conveyor run 20 with the specific goods to be moved along the conveyor run 20.

It will be understood that the differential impulse driver 24 may be reversed to move the tray 22 from the leftmost position at a great rate of acceleration and in the direction indicated by the arrow 38 to cause the goods to slide along the tray 22, and then to move the tray 22 from the rightmost position and at a lover rate of acceleration to cause the goods to move with the tray 22 and in the direction indicated by the arrow 39. This reversed mode of operation of the conveyor run 20 will move goods along the tray 22 in the direction indicated by the arrow 39.

Adjustable gates 10 are provided within the conveyor run 20 of FIG. 1 to provide the option of controllably splitting a stream of goods received at the adjustable gate 10 on the conveyor run 20 into two or more separated streams of goods that can be separately distributed using, for example, other conveyor runs, to a variety of stations and/or processes within a goods processing plant and at which the separated stream of goods may be treated, seasoned, conditioned, packaged, etc. The configuration of the conveyor run 20 with adjustable gates 10 in the position illustrated in FIG. 1 will result in simple pass-through of goods; that is, the adjustable gates 10 in the conveyor run 20 illustrated in FIG. 1 are in a closed position (openings in the adjustable gates are in an elevated position) to prevent separation of a stream of goods that enter either of the adjustable gates 10. As will be explained below in more detail, one or both of the adjustable gates 10 in the conveyor run 20 of FIG. 1 may be selectively adjusted to separate a stream of goods entering the adjustable gate 10. As presently configured, however, the conveyor run 20 of FIG. 1 will move a stream of goods from a first end 30, through the closed adjustable gates 10 and off the second end 31 of the conveyor run 20 if the differential impulse driver 24 is operated to move goods on the tray 22 in the direction indicated by arrow 38. If the differential impulse driver 24 is operated to move the goods on the tray 22 in the direction indicated by arrow 39, the conveyor run 20 will move a stream of goods from the second end 31, through the closed adjustable gates 10 and off the first end 30.

While the tray 22 illustrated in FIG. 1 is generally semi-circular in shape, an alternate embodiment of the tray 22 could have a relatively flat and horizontal bottom with generally linear tray sides projecting upwardly at an obtuse angle to the bottom, much like the profile of an inverted isosceles trapezoid. A tray 22 having an inverted isosceles trapezoid cross-section may include a transition to a semi-circular cross-section positioned immediately adjacent to each end of an adjustable gate 10. The semi-circular tray is the preferred configuration as it self-centers the product or goods moving through the conveyor run 20 to allow the next gate to drop and/or pass the correct proportion of the incoming product.

Figure 2:
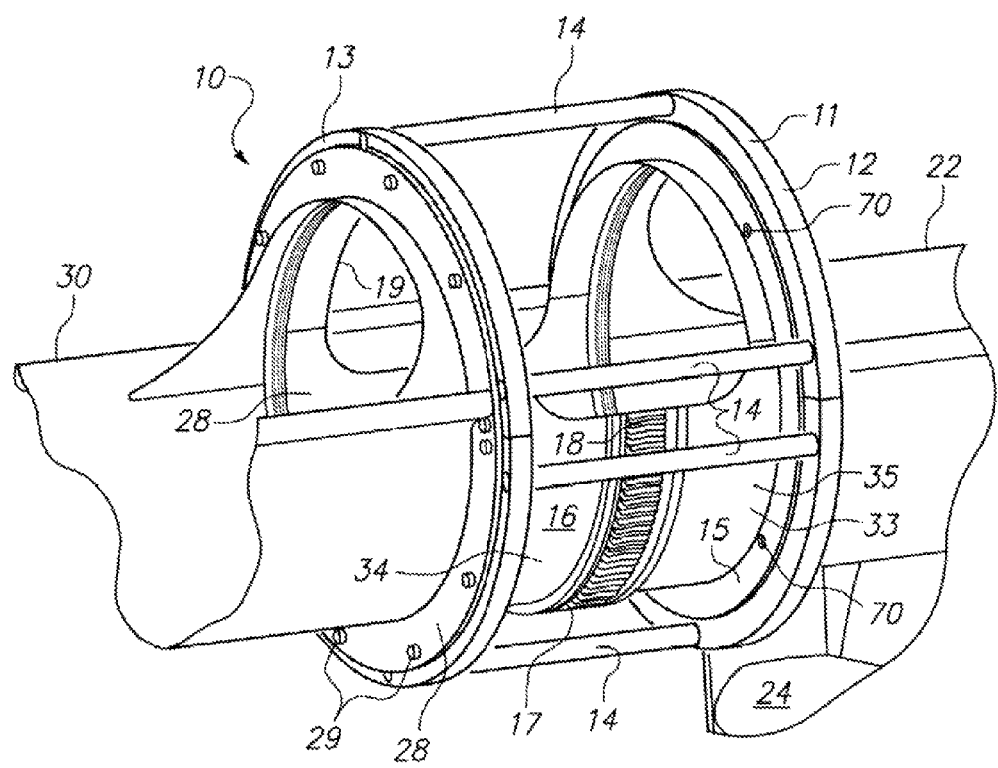
FIG. 2 is an enlarged view of one of the adjustable gates of FIG. 1 with the rotatable sleeve drive motor removed to reveal details of the adjustable gate.

FIG. 2 is an enlarged view of the leftmost of the adjustable gates 10 of the conveyor run 20 of FIG. 1 with the drive motor removed to reveal structural details of the adjustable gate. The adjustable gate 10 of FIG. 2 comprises a cage 11 having a first end flange 12, a second end flange 13 and a plurality of circumferentially-spaced braces 14 connected therebetween. A conveyor portion 30 is connected at a flange coupling 15 to the second end flange 13 of the adjustable gate 10. The tray 22 is similarly connected at a flange coupling 15 to the first end flange 12.

The braces 14 of the adjustable gate 10 are connected between the first end flange 12 and the second end flange 13 of the cage 11. The braces 14 are together sufficiently robust to transfer large and cyclically-reversing loads imparted to the tray 22 coupled to the first end flange 12 of the cage 11, to the cage 11 itself, and to the conveyor portion 30 coupled to the second end flange 13 of the cage 11. More specifically, the braces 14 transfer loads imparted by the differential impulse driver 24, to the tray 22 through the first end flange 12 of the cage 11, through the braces 14, and to the second end flange 13 of the cage 11 to the conveyor portion 30. It will be understood that the load transferred by the braces 14 of the cage 11 of the adjustable gate 10 may generally include a cyclic compression-alternating-tension load directed generally along the braces 14 as a result of the reciprocation of the conveyor run 20 using the differential impulse driver 24. The loading may further include a cycling bending moment attributable to the centroid of the weight of the conveyor portions, for example, conveyor portion 30 and tray 22, located to the left and to the right of the adjustable gate 10, respectively, being below a center axis through the first end flange 12 and second end flange 13.

FIG. 2 illustrates a rotatable sleeve 16 movably received within the cage 11. The rotatable sleeve 16 of FIG. 2 is slidably coupled at first end 33 of the rotatable sleeve 16 to the first end flange 12 of the cage 11 and at a second end 34 of the rotatable sleeve 16 to the second end flange 13 of the cage 11. A gear 17, having a plurality of gear teeth 18, is wrapped along a curved outer surface 35 of the rotatable sleeve 16. The rotatable sleeve 16 comprises an opening 19. The rotatable sleeve 16 is rotatable about a center axis (not shown) using a motor (not shown in FIG. 2—see FIG. 3) to position the opening 19 between an elevated position, illustrated in FIG. 2, and a lowered position illustrated in FIG. 3. In one embodiment of the adjustable gate 10, the motor (not shown in FIG. 2) is reversible. The gear 17 extends only about a portion of the curved outer surface 35 of the rotatable sleeve 16 so as to leave the opening 19 unobstructed. It will be understood that the gear 17 may be described as a segment of a spur gear.

FIG. 2 reveals a tray flange 28 connected to the second end flange 13 of the cage 11 of the adjustable gate 10 using conventional fasteners 29. The tray flange 28 couples the conveyor portion 30 to the left of the adjustable gate 10 in FIG. 2 to the cage 11 of the adjustable gate 10. It will be understood that a similar tray flange 28 is disposed on the right side of the adjustable gate 10 in FIG. 2 to couple the tray 22 to the first end flange 12 of the cage 11 of the adjustable gate 11. FIG. 2 further reveals the rightmost positioning ring 15 of the rotatable sleeve 16 of the adjustable gate 10. The leftmost positioning ring 15 of the rotatable sleeve 16 of the adjustable flange 10 is hidden from view in FIG. 2. Each positioning ring 15 rotates within the cage 11 of the adjustable gate 10 along with the rotatable sleeve 16. The positioning ring 15 visible in FIG. 2 includes threaded apertures 70. These threaded apertures 70 are used to couple spring-biased plunger assemblies 71 (not shown in FIG. 2—see FIG. 8) to the positioning rings 15 on the rotatable sleeve 16 of an adjustable gate 10, as will be discussed in more detail in connection with FIG. 8.

Figure 3:
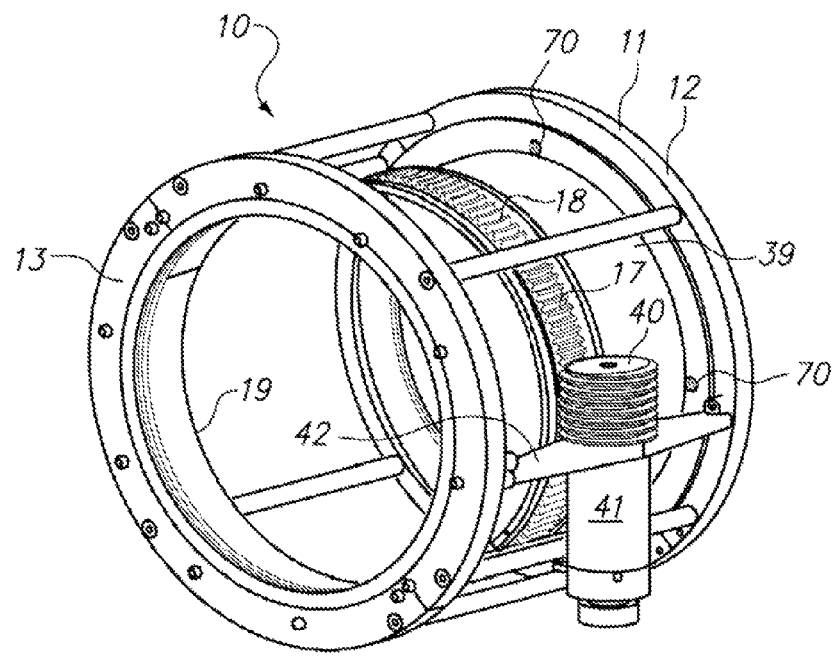
FIG. 3 is a perspective view of the embodiment of the leftmost adjustable gate of FIG. 1.

FIG. 3 is a perspective view of the embodiment of the adjustable gate 10 of FIG. 2 decoupled from the conveyor portion 30 and the tray 22 and with a motor 41 and a drive gear 40 operably coupled to controllably position the rotatable sleeve 16 within the cage 11 of the adjustable gate 10. The motor 41 is coupled to a motor support 42 that is, in turn, coupled intermediate the first end flange 12 and the second end flange 13 of the cage 11 of the adjustable gate 10. The drive gear 40, which is a worm gear, is rotatable by the motor 41 to slidably engage teeth 18 of the gear 17 and to move the gear 17 on the rotatable sleeve 16 either upwardly along the drive gear 40 or downwardly along the drive gear 40, depending on the direction of rotation of the drive gear 40 by the motor 41.

The adjustable gates 10 illustrated in FIGS. 1 and 2 show the rotatable sleeve 16 with the opening 19 in an elevated position so that all goods entering the adjustable gate 10 will pass through the rotatable sleeve 16 regardless of the direction of movement of the goods along the conveyor run 20. FIG. 3 shows the rotatable sleeve 16 with the opening 19 lowered by operation of the motor 41 so that goods entering the adjustable gate 10 will drop through the lowered opening 19 and from the adjustable gate 10 to a directly receiving conveyor so that no goods pass through the adjustable gate 10. It will be understood that the motor 41 of FIG. 3 can be controllably operated to position the opening 19 of the rotatable sleeve 16 of the adjustable gate 10 between these two extreme positions illustrated in FIG. 2 (elevated) and FIG. 3 (lowered) so that some of the goods are dropped from the adjustable gate 10 and some of the goods pass through the adjustable gate 10.

Figure 4:
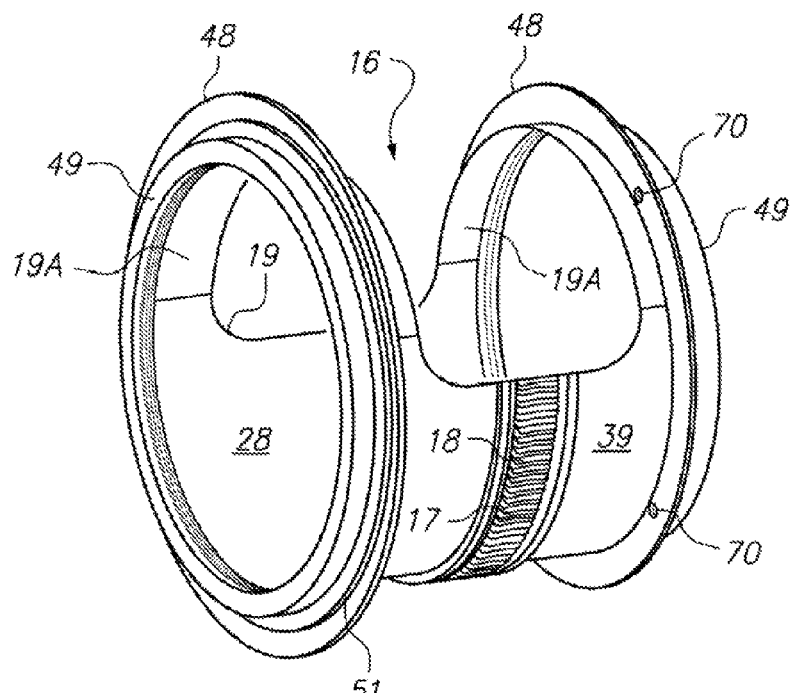
FIG. 4 is a perspective view of the rotatable sleeve of the adjustable gate of FIG. 3.

FIG. 4 is a perspective view of the rotatable sleeve 16 of the adjustable gate 10 of FIG. 3 disposed intermediate a pair of wear shoes 49. Each wear shoe 49 has a flange 51 that engages the positioning ring 48 of the rotatable sleeve 16. The wear shoes 49 reside within the cage 11 of the adjustable gate 10 along with the rotatable sleeve 16 to engage and position the positioning rings 48 of the rotatable sleeve 16 as it cyclically accelerates and decelerates within the cage 11 (see FIG. 3). The wear shoes 49 cooperate with plunger assemblies 71, which are discussed in more detail in connection with FIG. 8. FIG. 4 reveals the structures that seal with, position and movably couple the rotatable sleeve 16 within the cage 11. FIG. 4 reveals the positioning rings 48 extending radially outwardly from the rotatable sleeve 16, each positioning ring 48 having threaded apertures 70 for coupling spring-biased plunger assemblies 71. In the assembled state illustrated in FIG. 3, the rightmost positioning ring 48 (not shown in FIG. 3—see FIG. 4) of the rotatable sleeve 16 is received into a corresponding interior groove (not shown) within a bore of the first end flange 12 (not shown in FIG. 4—see FIG. 3) of the cage 11 and the leftmost positioning ring 48 (not shown in FIG. 3—see FIG. 4) is received into a corresponding interior groove (not shown) within a bore of the second end flange 13 (not shown in FIG. 4—see FIG. 3) of the cage 11. As can be seen in FIG. 3, the first end flange 12 and the second end flange 13 are each constructed by combining two semi-circular halves and coupling the halves together to form the fully circular first and second end flanges 12 and 13. This arrangement is akin to a clamshell structure that receives the positioning rings 48 within interior grooves within the end flanges 12 and 13 of the cage 11. The positioning rings 48 of the rotatable sleeve 16 illustrated in FIG. 4 radially engage and slide within the corresponding interior grooves of the cage 11, and axially engage and rotate against the wear shoes 49 captured within the cage 11 along with the rotatable sleeve 16. The wear shoes 49 and the cage 11 cooperate to maintain the rotatable sleeve 16 in a desired position within the cage 11 while allowing the opening 19 to be selectively positioned by operation of the motor 41.

It will be understood that the cyclic acceleration and deceleration imparted to the adjustable gates 10 through the tray 22 (see FIG. 1) would impart a recurring slapping or lashing effect to the rotatable sleeve 16 disposed within the cage 11 of the adjustable gate 10 without mechanical features provided to minimize the damage resulting from such rigorous motion. The wear shoes 49 function as very (axially) short journal bearings that intermittently engage and bear against the rotatable sleeve 16 within the bores of the first end flange 12 and the second end flange 13 of the cage 11. When the motor 41 is operated, the rotatable sleeve 16 is rotated within the cage 11 of the adjustable gate 10 to elevate or to lower the opening 19. If the opening 19 is positioned as illustrated in FIG. 3, goods moving from, for example, the tray 22 into the rotatable sleeve 16 of the adjustable gate 10 will fall through the opening 19 to a receiving structure such as, for example, a receiving conveyor portion or other process structure there below. When the rotatable sleeve 16 is rotated within the cage 11 of the adjustable gate 10 to elevate the opening 19, as illustrated in FIGS. 1, 2 and 4, goods entering the adjustable gate 10 will pass through the rotatable sleeve 16 and through the wear shoes 49 that straddle the rotatable sleeve 16. The adjustable gate 10 opening 19 may be positioned at a number of positions intermediate the lowered and elevated positions illustrated in FIGS. 2 and 3 so that a controllably selected fraction of the goods that enter the adjustable gate 10 will pass through the rotatable sleeve 16 of the adjustable gate 10 and remain on the conveyor run while the remainder of the goods will pass through the opening 19 of the adjustable gate 10 and be dropped from the conveyor run 20 that includes the adjustable gate 10.

Foodstuffs are among the types of goods that can be moved and transported using embodiments of the conveyor run and embodiments of the gate of the present invention. By their nature, foodstuffs such as, for example, potato chips and other prepared foods, are seasoned, salted or produce crumbs as a result of being handled and moved. It is advantageous if embodiments of the gate of the present invention are constructed to move this type of goods through the gate, or into the gate and through the opening of the rotatable sleeve, with minimal breakage of the goods and in a manner that prevents fouling of the moving parts of the gate by broken crumbs, seasoning, salt, etc. that may find their way into crevices, gaps, seams and recesses in the gate itself or in the interfaces at the ends of the gate where the gate meets with conveyor portions that can be used to move goods into the gate or to receive goods moving from the gate.

One embodiment of the gate of the present invention includes structures to isolate the surfaces of the rotatable sleeve 16 on which goods are supported and moved and to prevent unwanted materials from escaping the goods-supporting surfaces or from fouling the interfaces between moving and non-moving components of the gate.

Figure 5:
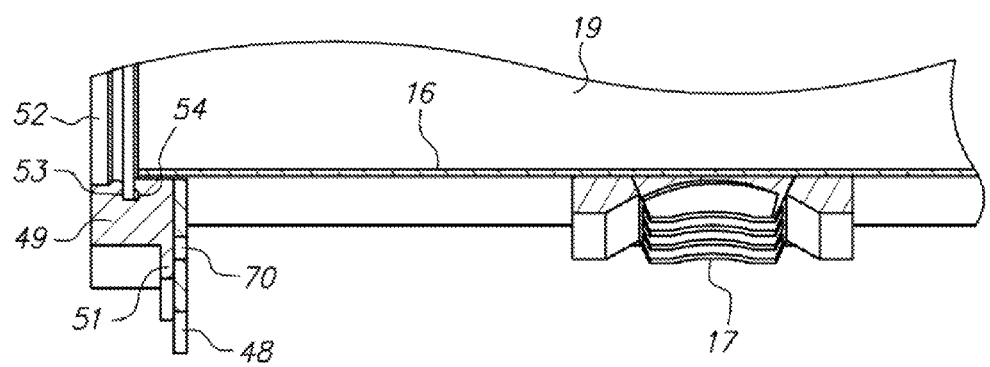
FIG. 5 is a partial cross-sectional view of a portion of the adjustable gate and a wear shoe.

FIG. 5 is an enlarged partial cross-sectional view of a portion of an embodiment of the adjustable gate 10. The position of the rotatable sleeve 16 in FIG. 5 corresponds to the opening 19 being in the elevated position as illustrated in FIG. 4 and reveals the sealing structures between the rotatable sleeve 16 and the wear shoe 49 disposed adjacent thereto. FIG. 5 also shows the gear 17 of the rotatable sleeve 16 and the leftmost positioning ring 48 of the rotatable sleeve 16 disposed adjacent to the wear shoe 49. The wear shoe 49 includes a seal groove 54 into which a seal extension 53 is received.

Figure 6:
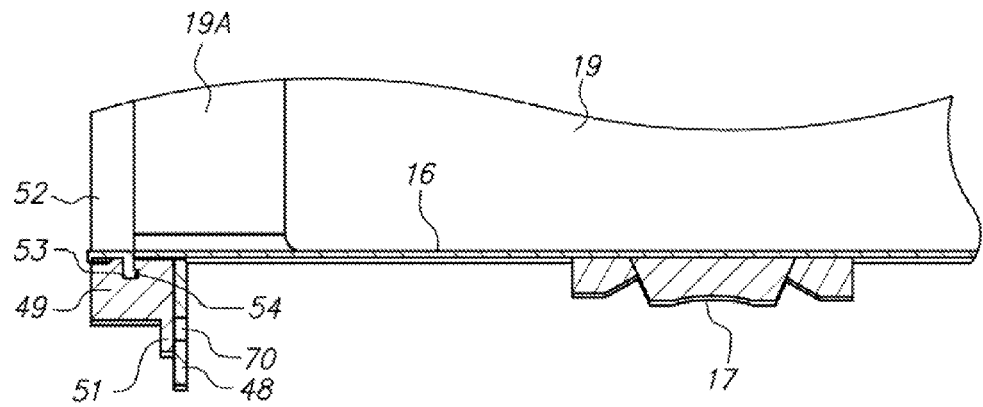
FIG. 6 is a partial cross-sectional view of a portion of the adjustable gate showing the relationship of the rotatable sleeve, an adjacent wear shoe and a seal.

FIG. 6 is an enlarged partial cross-sectional view of a portion of an embodiment of the adjustable gate 10. The position of the rotatable sleeve 16 in FIG. 6 corresponds to the opening 19 being in the lowered position as illustrated in FIG. 3 and reveals the sealing structures between the rotatable sleeve 16 and the wear shoe 49. The rotatable sleeve 16 includes the opening 19 and the adjacent opening periphery 19A (also shown in FIG. 4). FIG. 6 also shows the gear 17 of the rotatable sleeve 16 and the leftmost positioning ring 48 of the rotatable sleeve 16 disposed adjacent to the wear shoe 49. The wear shoe 49 includes a radially-outwardly extending portion 51 to increase the area of engagement between the wear shoe 49 and the positioning ring 48. The threaded aperture 70 in the positioning ring 48 of the rotatable sleeve 16 is shown in FIG. 5. This threaded aperture 70 is discussed in more detail below and in connection with FIG. 8.

Wear shoes 49 bear the axial loading of the rotatable sleeve 16 of the adjustable gate 10 that results from the adjustable gate 10 being cyclically moved back and forth by the differential impulse driver 24 shown in FIG. 1. It will be understood that cyclical forces imparted by the differential impulse driver 24 through a conveyor portion proximal to the adjustable gate 10 are transferred to the rotatable sleeve 16 and to the abutting wear shoes 49 through spring-biased plunger assemblies 71 (see FIG. 7).

Figure 7:
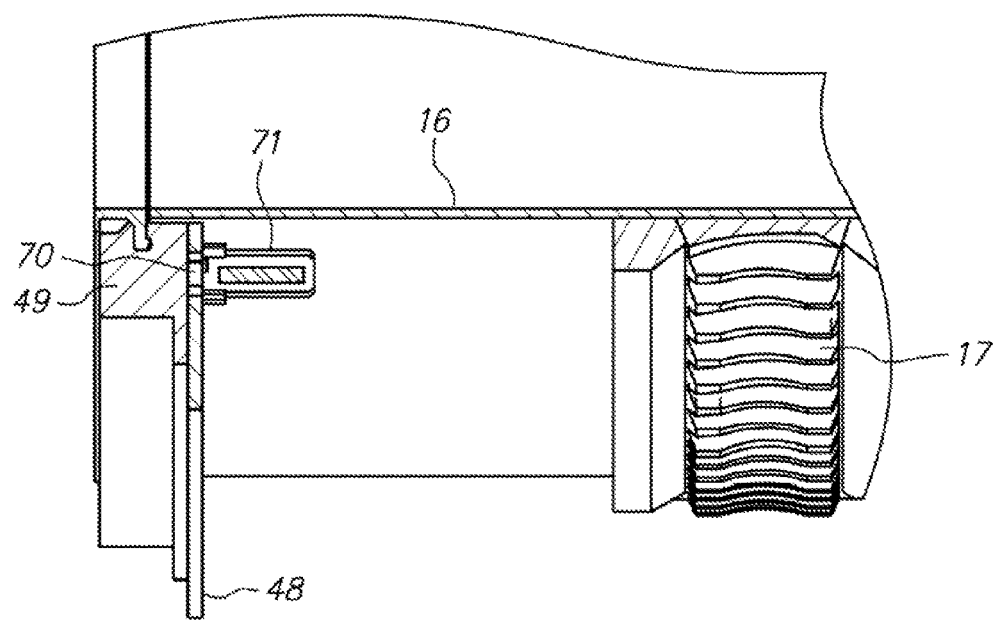
FIG. 7 is an enlarged partial cross-sectional view of a portion of an embodiment of the adjustable gate after a plunger assembly is coupled to the rotatable sleeve.

FIG. 7 is an enlarged partial cross-sectional view of a portion of an embodiment of the adjustable gate 10 after a plunger assembly 71 is coupled to the rotatable sleeve 16. The plunger assembly 71 is coupled to the rotatable sleeve 16 intermediate the rotatable sleeve 16 and the wear shoe 49 disposed adjacent to the positioning ring 48 of the rotatable sleeve 16. In one embodiment of the adjustable gate 10 of the present invention, a plunger assembly 71 is coupled to the positioning ring 48 at the left side of the adjustable gate 10 and another spring-biased plunger assembly 71 is coupled to the opposite, right side of the adjustable gate 10 to provide controlled movement of the rotatable sleeve 16 of the adjustable gate 10 relative to the straddling wear shoes 49 on either side of the rotatable sleeve 16.

Figure 8:
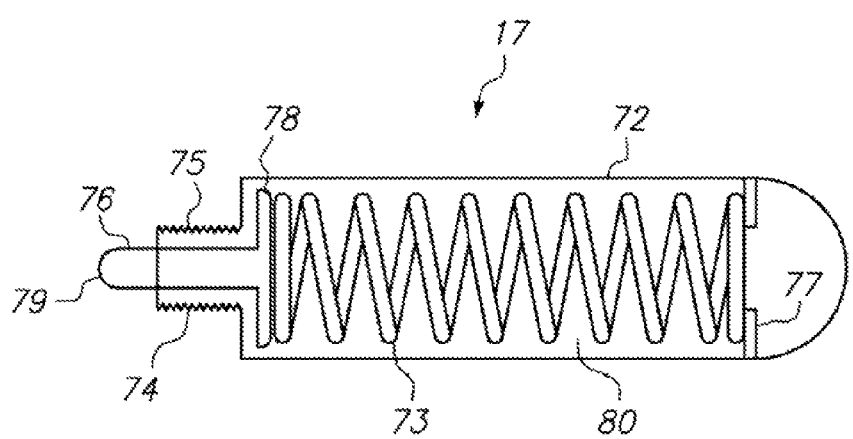
FIG. 8 is an enlarged and sectional view of the spring-biased plunger assembly of FIG. 7 removed from the rotatable sleeve for clarity.

FIG. 8 is an enlarged and sectional view of the spring-biased plunger assembly 71 of FIG. 7 removed from the rotatable sleeve 16 for clarity. The plunger assembly 71 comprises a body 72 having an interior chamber 80 to receive a coil spring 73 therein. The coil spring 73 is captured in a slightly compressed configuration intermediate the stop 77 near the end of the chamber 80 and a plunger tip 76. The body 72 includes a connector 74 having a diameter and threads 75 that correspond to the diameter and threads within the threaded aperture 70 in the positioning rings 48 (see FIGS. 2-4, 5 and 6). The plunger tip 76 includes a base 78 that engages the coil spring 73 and a wear-resistant nose 79 that engages the wear shoe 49 as shown in FIG. 7.

It will be understood that the rotation of the rotatable sleeve 16 within the cage 11 requires at least some clearance between the rotatable sleeve 16 and the straddling wear shoes 49. The amount of clearance may be, for example, 20 to 30 thousands of an inch. The clearance between the surface of the wear shoe 49 and the adjacent positioning ring 48 of the rotatable sleeve 16, along with the thickness of the positioning ring 48 and the mass of the rotatable sleeve 16, are among the factors that can be considered in the design of the plunger assembly 71. It will be further understood that, as the plunger assembly 71 is threadably installed into the threaded apertures 70 of the positioning rings 48 of the rotatable sleeve 16, the coil spring 73 will begin to be compressed at the time that the nose 79 of the plunger tip 76 engages the wear shoe 49 and, as the plunger assembly 71 is threaded into the aperture 70, the coil spring 73 will be loaded. The plunger assemblies 71 will maintain the position of the rotatable sleeve 16 between the straddling wear shoes 49 and will store and return kinetic energy imparted to the rotatable sleeve 16 by operation of the differential impulse driver 24. The plunger assemblies 71 will protect the rotatable sleeve 16 against the damaging effects of recurring cyclic slap that would otherwise damage the rotatable sleeve 16.

Figure 9:
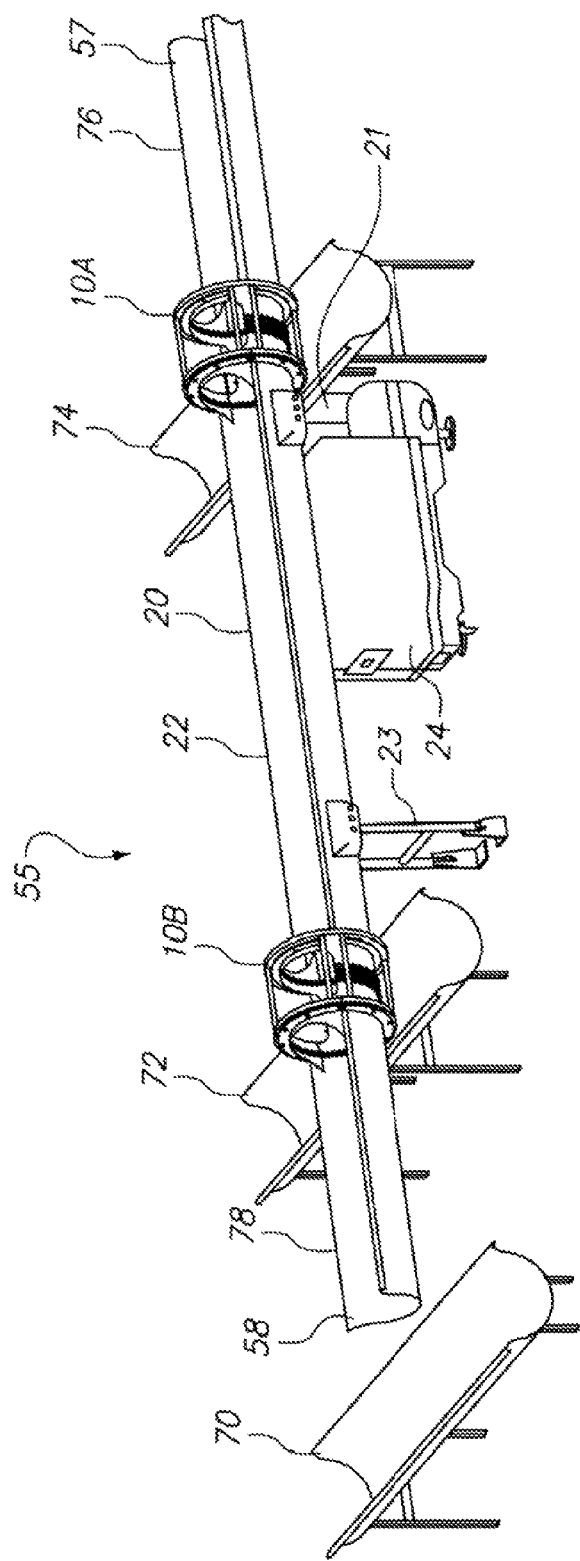
FIG. 9 depicts another embodiment of a conveyor system, with a conveyor portion separated from an adjacent conveyor portion by first (rightmost) adjustable gate, and with conveyor portion separated from an adjacent conveyor portion by second (leftmost) adjustable gate.

FIG. 9 depicts another embodiment of a conveyor system 55, with a conveyor portion 76 separated from an adjacent conveyor portion 22 by first (rightmost) adjustable gate 10A, and with conveyor portion 22 separated from an adjacent conveyor portion 78 by second (leftmost) adjustable gate 10B. A receiving conveyor 74 is positioned to receive goods dropped from the first adjustable gate 10A, and another receiving conveyor 72 is positioned to receive goods dropped from the second adjustable gate 10B. Another receiving conveyor portion 70 is positioned to receive goods that move from right to left and that are not dropped from either of the adjustable gates 10A and 10B.

Conveyor portion 76, the first adjustable gate 10A, conveyor portion 22, the second adjustable gate 10B and conveyor portion 78 all combined make up conveyor run 20. Receiving conveyor 74, receiving conveyor 72 and receiving conveyor 70 may, in certain configurations of the adjustable gates 10A and 10B, receive goods received onto the conveyor run 20 at the receiving end 57. Goods routed to receiving conveyor 70 are discharged from dropping end 58 of the conveyor run 20. It will be understood that the terms "receiving end 57" and "dropping end 58" are direction dependent terms, and indicate that the differential impulse driver 24 is configured to move goods from right to left along the conveyor run 20. If the differential impulse driver 24 is reversed to move goods from the left to the right along the conveyor run 20, the terms would be reversed to indicate a receiving end 58 and a dropping end 57. It will also be understood that the source conveyor is not shown in FIG. 9 for clarity, but a source conveyor providing goods to be moved on the conveyor system 55 of FIG. 9 would drop the goods onto one of conveyor portion 76, conveyor portion 22 and conveyor portion 78. It will be further understood that two source conveyors may be used to drop goods to be moved on the conveyor system 55. For example, source conveyors could drop goods onto all three of conveyor portion 76, conveyor portion 22 and conveyor portion 78 if the differential impulse driver 24 is configured to move goods from right to left in FIG. 9. Source conveyors could also drop goods onto conveyor portion 76, conveyor portion 22 and conveyor portion 78 if the differential impulse driver 24 is configured to move goods from left to right in FIG. 9, depending on what is provided to the right of what would, with that configuration of the differential impulse driver 24, be dropping end 57. The conveyor system 55 of FIG. 9 provides a highly versatile system for distributing one or more source streams of goods to multiple locations, with adjustable gates 10A and 10B providing a large amount of the flexibility.

Figure 10:
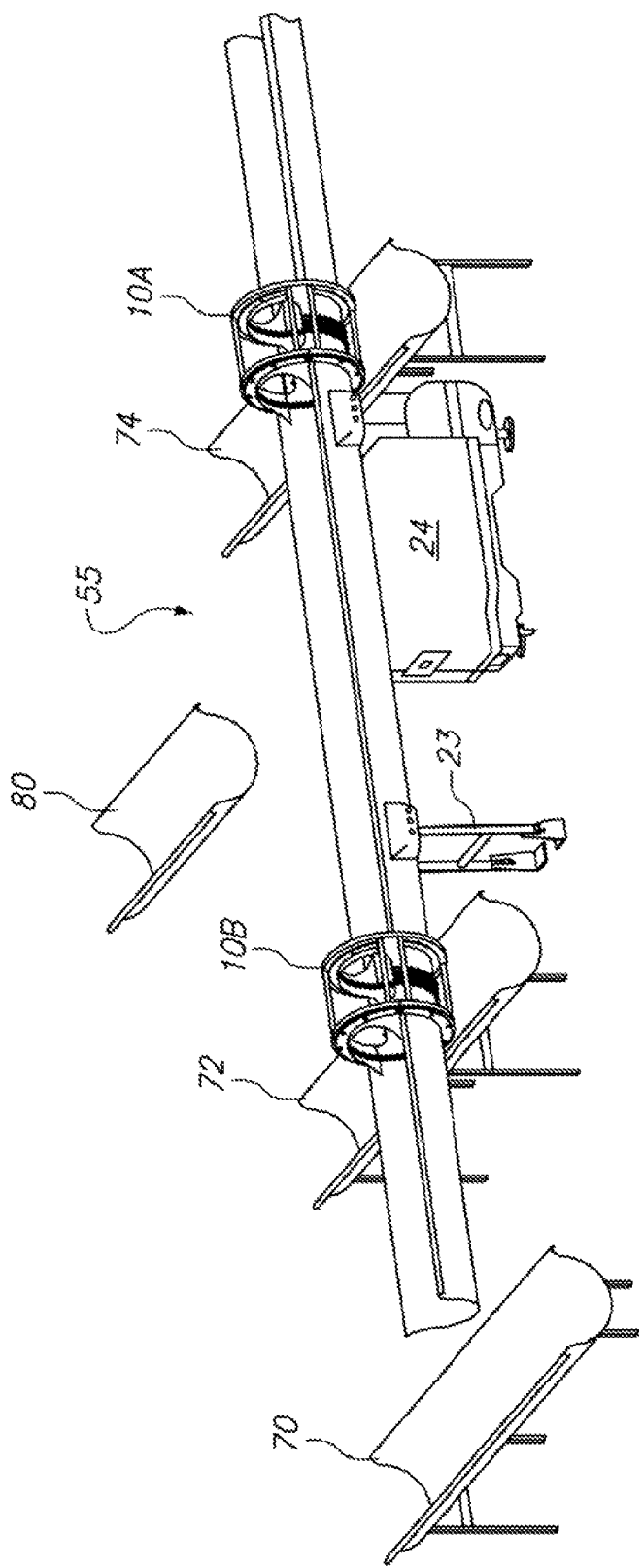
FIG. 10 depicts another embodiment of the conveyor system, with a single source conveyor feeding conveyor run.

FIG. 10 depicts another embodiment of the conveyor system 55, with a single source conveyor 80 feeding conveyor run 20. It will be understood that the goods moved by the source conveyor 80 can be routed, using the conveyor system 55, to a single destination accessible through the conveyor run 20 and one of the receiving conveyors 70, 72, and 74. Alternately, the goods moved by the source conveyor 80 can be separated, using one of the adjustable gates 10A and 10B, into two or more streams, each comprising a portion of the stream of goods deposited from the source conveyor 80 onto the conveyor run 20, and routed to two or more destinations accessible through receiving conveyors 70, 72, and 74 or through other receiving conveyors off to the right of the conveyor system 55 shown in FIG. 9. It will be understood that, just as the adjustable gates 10A and 10B can be manipulated to reroute the goods received onto the conveyor run 20, the differential impulse drive 24 also be manipulated (reversed) to reroute goods received on conveyor run 20. It will be further understood that while receiving conveyors 70, 72 and 74 are shown without differential impulse drivers 24, these conveyor runs may also be equipped with differential impulse drivers 24 and pivoting support legs 23 to add more options for the distribution of goods at a process site.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers steps, operations, elements, components and/or groups, but do not preclude the presence or addition of one or more other features, integers, steps, operations, elements components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An adjustable gate connectable between a conveyor first portion and a conveyor second portion of a conveyor run, the adjustable gate comprising:
   a cage having a first end flange connectable to the first conveyor portion of a conveyor run, and having a second end flange, opposite the first end flange, connectable to the second conveyor portion of the conveyor run;
   a rotatable sleeve having a circumference and an opening along a portion of its circumference, a first end movably coupled to the first end flange of the cage, a second end movably coupled to a second end flange of the cage to provide for rotation of the rotatable sleeve within the cage, and a gear having a plurality of teeth provided along an outer surface of the rotatable sleeve adjacent to the opening;
   a first spring-biased plunger assembly disposed intermediate the rotatable sleeve and the conveyor first portion;
   a second spring-biased plunger assembly disposed intermediate the rotatable sleeve and the conveyor second portion; and
   a motor connected to at least one of the cage, the conveyor first portion and the conveyor second portion and operable to rotate a drive gear engaged with the gear of the rotatable sleeve.

2. The adjustable gate of claim 1, wherein the rotatable sleeve further comprises:
   a first end positioning ring extending radially outwardly from the rotatable sleeve at a first end and movably received within a corresponding groove within the first end flange of the cage; and
   a second end positioning ring extending radially outwardly from the rotatable sleeve at a second end and movably received within a corresponding groove within the second end flange of the cage;
   wherein the first spring-biased plunger assembly is coupled to the first end positioning ring; and
   the second spring-biased plunger assembly is coupled to the second end positioning ring.

3. The adjustable gate of claim 1, wherein the motor is a servo motor and the drive gear is a worm gear that engages at least one tooth of the plurality of teeth of the gear on the rotatable sleeve.

4. The adjustable gate of claim 1, further comprising:
   a second adjustable gate disposed within the conveyor run downstream from the first adjustable gate and secured within the downstream portion of the conveyor run; and
   a second downstream portion of the conveyor run downstream from and secured to the second rotatable sleeve.

5. The adjustable gate of claim 1, further comprising:
   a flange secured to the first portion of the tray;
   the rotatable flange secured to the rotatable sleeve; and
   a plurality of securing members for connecting the tray flange and the rotatable flange.

6. A conveyor run, comprising:
   a conveyor first portion having an end adapted for coupling to an adjustable gate;
   a conveyor second portion having an end adapted for coupling to an adjustable gate;
   an adjustable gate connected between the ends of the conveyor first portion and the conveyor second portion and including:
      a cage having a first end flange connectable to the end of the conveyor first portion, and having a second end flange, opposite the first end flange, connectable to the conveyor second portion;
      a rotatable sleeve having a circumference and an opening along to portion of the circumference, a first end movably coupled to the first end flange of the cage, a second end movably coupled to a second end flange of the cage, and a gear with a plurality of teeth along an outer surface of the rotatable sleeve and circumferentially adjacent to the opening;
      a first spring-biased plunger assembly disposed intermediate the rotatable sleeve and the conveyor first portion;
      a second spring-biased plunger assembly disposed intermediate the rotatable sleeve and the conveyor second portion;
      a motor connected to at least one of the cage, the conveyor first portion and the conveyor second portion and operable to rotate a drive gear engaged with the gear of the rotatable sleeve to enable selective positioning of the opening between an elevated position relative to the cage and a lowered position relative to the cage; and
      a differential impulse driver coupled to at least one of the conveyor first portion and the conveyor second portion to reciprocate the conveyor run with unequal accelerations in a first direction and a second direction opposite to the first direction to move goods along the conveyor first portion and into the adjustable gate.

7. The conveyor run of claim 6, wherein operation of the differential impulse driver moves goods deposited one of the conveyor first portion and the conveyor second portion into the rotatable sleeve of the adjustable gate; and
   wherein goods entering the rotatable sleeve from the one of the conveyor first portion and the conveyor second portion when the opening is in the lowered position are dropped from the conveyor run;
   wherein goods entering the rotatable sleeve from the one of the conveyer first portion and conveyor second portion when the opening is in the elevated position are retained on the conveyor run and move through the adjustable gate to the other of the conveyor first portion and the conveyor second portion; and
   wherein goods entering the rotatable gate member from the one of the conveyor first portion and conveyor second portion when the opening is in a position intermediate the lowered position and the elevated position are separated into a first fraction that is retained on the conveyor run and move through the adjustable gate to the other of the conveyor first portion and conveyor second portion and a second fraction that is dropped from the conveyor run through the opening in the rotatable sleeve.

8. The adjustable gate of claim 6, wherein the differential impulse driver is selectively operable to cyclically move the conveyor run in a first direction, opposite to the direction of movement of the goods, and at a first acceleration sufficient to cause goods to slip along a goods-supporting surface of the conveyor run, and then in a second direction, that is the same as the direction of movement of goods, and at a second acceleration that is less than the first acceleration and that is generally insufficient to cause the goods to slip along the goods-supporting surface of the conveyor run;

wherein the cyclic movement of the conveyor run in this manner results in a generally steady movement of goods along the first portion of the conveyor run and into the adjustable gate; and wherein the first fraction of the goods that are moved into the adjustable gate by operation of the differential impulse driver and that move through the adjustable gate onto the second portion of the conveyor run is determined by the position of the opening in the rotatable sleeve of the adjustable gate.

9. The adjustable gate of claim 6, wherein the cage of the adjustable gate includes a plurality of circumferentially-spaced load members connected at a first end to a first end flange and at a second end to a second end flange;

wherein a cyclically variable force applied to a first conveyor portion connected to the first end flange is transferred through the load members to the second conveyor portion.

10. The adjustable gate of claim 6, wherein the differential impulse driver is reversible to drive goods in a reverse direction to move goods on the second conveyor portion to the adjustable gate; and wherein the reversed differential impulse motor cyclically moves the conveyor run in the first direction, opposite to the direction of movement of the goods, and at a slow rate of movement that is insufficient to cause the goods to slip along a goods-supporting surface of the conveyor run, and then in the second direction that is opposite the direction of movement of goods at a rapid rate of movement that is sufficient to cause the goods to slip along the goods-supporting surface of the conveyor run;

wherein the cyclic movement of the conveyor run in this manner results in a generally steady movement of goods along the second portion of the conveyor run and into the adjustable gate; and a fraction of the goods that are moved into the adjustable gate by operation of the differential impulse motor and that move through the adjustable gate onto the upstream portion of the conveyor run is determined by the position of the discharge opening in the rotatable sleeve of the adjustable gate.

11. A adjustable gate for being coupled between a conveyor first portion and a conveyor second portion, comprising:

a cage having a first end flange and a second end flange and a plurality of load-transferring braces coupled therebetween;

a rotatable sleeve movably received within the cage to rotate about an axis of the cage and having a discharge opening along a portion of its circumference for selectively dropping goods from the rotatable sleeve;

a motor coupled to drive a worm gear to rotate the rotatable sleeve about the axis of the cage;

a first spring-biased plunger assembly disposed intermediate the rotatable sleeve and the conveyor first portion; and a second spring-biased plunger assembly disposed intermediate the rotatable sleeve and the conveyor second portion.

* * * * *